US005597136A

United States Patent [19]
Wilke

[11] Patent Number: 5,597,136
[45] Date of Patent: Jan. 28, 1997

[54] METHOD OF INDEPENDENTLY CONTROLLING A GUIDED FLYING BODY BEARING A WARHEAD AND ARRANGEMENT FOR IMPLEMENTING THE METHOD

[75] Inventor: Karl-Heinz Wilke, Ulm, Germany

[73] Assignee: Deutsche Aerospace AG, Munich, Germany

[21] Appl. No.: 609,416

[22] Filed: Mar. 1, 1996

Related U.S. Application Data

[63] Continuation of Ser. No. 86,640, Jun. 28, 1993, abandoned.

[30] Foreign Application Priority Data

Jun. 29, 1992 [DE] Germany .......................... 42 20 748.7
Mar. 23, 1993 [DE] Germany .......................... 43 09 295.0

[51] Int. Cl.⁶ ........................................................ F41G 7/24
[52] U.S. Cl. .......................... 244/3.16; 244/3.15; 244/3.19
[58] Field of Search ........................................ 244/3.1, 3.15, 244/3.16, 3.19

[56] References Cited

U.S. PATENT DOCUMENTS

| | | | |
|---|---|---|---|
| 4,614,317 | 9/1986 | Stavis | 244/3.19 |
| 4,796,834 | 1/1989 | Ahlström | 244/3.16 |
| 5,088,659 | 2/1992 | Neff et al. | 244/3.16 |

FOREIGN PATENT DOCUMENTS 1535679  12/1978  United Kingdom .
2126322   3/1984  United Kingdom .

*Primary Examiner*—Ian J. Lobo
*Attorney, Agent, or Firm*—Spencer & Frank

[57] ABSTRACT

A method for the independent control of a guidable flying body that is provided with a warhead and to an arrangement for implementing the method.

The method resides in that the flying body flies on a curved flight path during its flight approach phase and, on the curved flight path, the ratio S/C between the signals S reflected by the ground target and the clutter C of the ground, on the average, is kept constant or at least approximately constant. The path vector of the flying body during the subsequent target approach phase is oriented in the direction of the ground.

The arrangement is configured in such a that an antenna array constructed of transmitting and receiving antennas is configured as a rigid component group that is fixed to the flying body and is switched to act on a transmit/receive unit, or a transmit/receive unit composed of light source(s) and detectors and operating on an optical basis is configured as a rigid component group that is connected with the flying body and the detectors are switched to act on an evaluation unit.

20 Claims, 8 Drawing Sheets

METHOD OF INDEPENDENTLY CONTROLLING A GUIDED FLYING BODY BEARING A WARHEAD AND ARRANGEMENT FOR IMPLEMENTING THE METHOD

This application is a continuation of application Ser. No. 08/086,640, filed Jun. 28, 1933, now abandoned.

CROSS REFERENCE TO RELATED APPLICATIONS

This application claims the priority of application serial numbers DE P 42 20 748.7 of Jun. 29th, 1992 and P 43 09 295.9 of Mar. 23rd, 1993, both of which are incorporated herein by reference.

BACKGROUND OF THE INVENTION

The present invention relates to a method of independently controlling a guided flying body provided with a warhead wherein the flying body is a projectile or a sub-caliber missile which is provided with an active target seeking head that emits target seeking signals and which is employed for combatting stationary and moving ground targets.

Arrangements of this type are employed, for example, in rockets, guided missiles, subcaliber missiles, artillery ammunition and proximity weapons and are preferably used for missiles or flying bodies.

In connection with conventional missiles or flying bodies, methods are known for independently controlling a guidable flying body that is provided with a warhead. These flying bodies are projectiles or sub-caliber missiles having an active target seeking head. The projectile or the sub-caliber missile is here used to combat stationary or moving ground targets.

It is an object of the present invention, on the one hand, to provide a method with which, for example, a flying body, during its target approaching phase, utilizes the ground clutter (hereinafter called clutter) to control the flying body. On the other hand, it is an object of the present invention to provide an arrangement with which the flying body can be directed onto a ground target, with it being possible to scan the ground and the ground target by economic means.

SUMMARY OF THE INVENTION

The above object generally is achieved according to the invention with respect to the method by causing the flying body to fly on a curved flight path during its target approaching phase, with the ratio S/C between the signals S reflected by the ground target and the echo C from the ground (clutter signal), on the average, being kept constant or at least approximately constant on the curved flight path. During the target approach phase, the path vector of the flying body is oriented in the direction of the ground.

With respect to the device according to the invention, the above object generally is achieved in that an antenna array composed of transmitting and receiving antennas is configured as a rigid component group that is fixed to the flying body and is switched to act on a transmitting and receiving unit. As an alternative, a transmitting and receiving unit composed of illumination source(s) and detectors and operating on an optical basis is configured as a rigid component group that is fixed to the flying body and the detectors are switched to act on an evaluation unit.

The advantages of the method are, inter alia, that the target signal and the clutter signal (echo signal) having the greatest Doppler shift are processed simultaneously into a guidance signal.

The advantages of the arrangement are that a ground and ground target scan is effected without mechanically moving parts.

In this way it is possible to manufacture the arrangement according to the invention at low cost. In addition, economical manufacturing technologies can be employed to realize the arrangement, for example those known from the lower GHz domain. Moreover, addition, the arrangement is resistant to high acceleration forces and is suitable for all-weather use.

The invention will be described in greater detail below in an exemplary manner for the case of its use in a flying body and with reference to the drawing figures. In the figures the reference numerals of the reference elements are the same in all figures for the same reference elements.

DETAILED DESCRIPTION OF THE PREFERRED EMBODIMENTS

Figure 1:
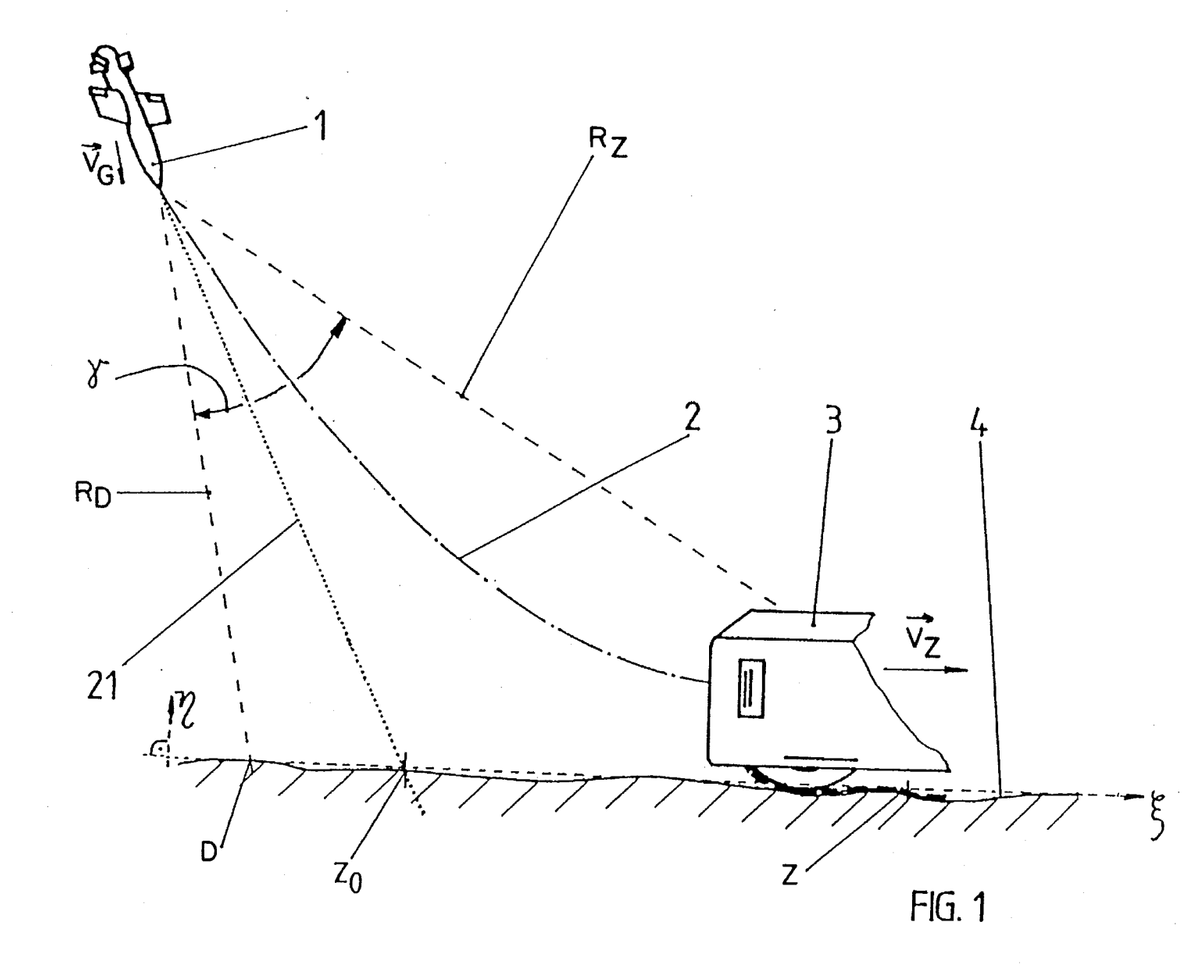
FIG. 1 depicts the flying body (missile) during its target approach phase.

FIG. 1 shows a flying body 1, which may be, for example, a guided rocket, during its target approach phase. The path vector of flying body 1, starting from the longitudinal axis of the flying body, is here oriented in the direction of the ground 4. The extension of path vector 21 in the direction of the ground 4 intersects this vector in a point of intersection Z which, at a time $t=t_o$ takes on a value of $Z_o$ on the abscissa $\xi$ of a cartesian coordinate system having an ordinate $\eta$ which defines the plane of the flight path ($\xi, \eta$). The time $t_o$ is here the earliest possible point in time during the target approach phase. No later than at this time $t_o$ does flying body 1 continuously send out signals by way of a transmitting antenna (not shown) during its approach to the target. These signals are reflected, on the one hand, by the ground target 3 and, on the other hand, by the ground 4 itself. These reflected signals S (from ground target 3) and C (from ground 4) are received by the receiving antennas (not shown) of flying body 1 and are evaluated in an evaluation unit (not shown). In dependence on the results of this evaluation, flying body 1 is then guided in a way that its flight path 2 is curved such that, on the average, the ratio between signal S reflected by the ground target—also called the ground target signal—and signal C reflected by the ground—also called the clutter signal—is kept constant or at least approximately constant. If ground target 3 does not move (is stationary), this results in an approximately circular flight path 2. The ratio S/C of ground target signal S to clutter signal C is here described approximately by the following relationship:

$$\frac{S}{C} = \text{constant} \simeq \frac{S}{\frac{R_Z}{\sin \gamma} \cdot \frac{c}{2f_s} \cdot B \cdot \frac{1}{V_G}} \quad (1.1)$$

where

S=the signal reflected from ground target 3;

$R_Z$=the linear distance between flying body 1 and ground target 3 ("target range");

γ=the angle between the direction of the distance $R_Z$ from flying body 1 to ground target 3 and the direction of the linear distance $R_D$ from flying body 1 to the penetration point D of the inherent velocity vector v̄ of flying body 1 ("line of sight angle");

c=the speed of light;

$f_s$=the transmitting frequency of the radar system of flying body 1; and

B=the evaluation bandwidth of the radar system of flying body 1; and $V_G$=the inherent velocity of flying body 1.

If ground target 3 is a moving target, this movement is detected by flying body 1 and a corresponding flight path correction is made. This correction may be effected in such a way that flying body 1 is directed onto an estimated point of impact which is removed from the momentary target location (momentary point of dwell of ground target 3) by a path section ΔZ. The estimation of this path may be effected, for example, according to the formula $$\Delta Z = T^* \cdot V_z$$

where $T^*$=the estimated time of the hit;

$V_z$=the speed of the ground target 3 moving on the ground 4; and

Figure 5:
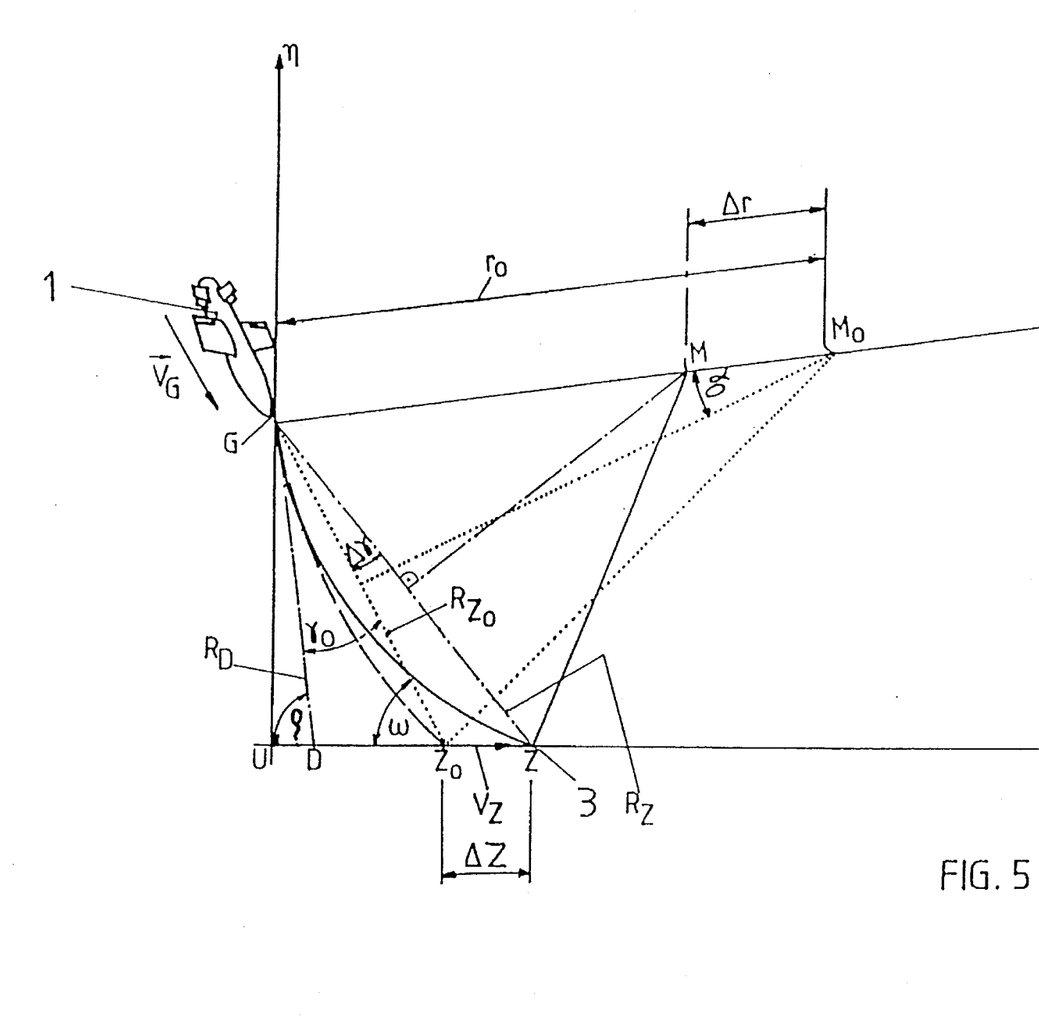
FIG. 5 is a sectional view of the $\xi/\eta$ plane of FIG. 3.

ΔZ=the portion of the path traversed by ground target 3 in the ξ, η plane (see FIG. 5).

To determine this ratio and the required transverse acceleration to guide flying body 1, the distance $R_z$ between flying body 1 and ground target 3, the distance $R_D$ between flying body 1 and penetration point D on the ground 4 and the line of sight angle γ between the two distances $R_z$ and $R_D$ are determined in the flying body, for example, with the aid of the forward looking synthetic aperture radar (FLSAR) method.

The inherent velocity of ground target 3 is determined, for example, from the ratio of the radial velocity of ground target 3 to the inherent velocity of flying body 1 multiplied by the cosine of the line of sight angle γ and is considered in the flight path correction. The flight path correction can be calculated, for example, on-line or can be read out from a stored table.

The transverse acceleration $b_q$ of flying body 1 to be developed is here described approximately by the following relationship:

$$b_q = \frac{2V_G^2 \sin \gamma_0}{R_{Z_0}} \quad (1.2)$$

where $V_G$=the inherent velocity of flying body 1;

$\gamma_o$=the line of sight angle at time $t=t_o$ of target acquisition; and $R_{Z_o}$=the distance of the target at time $t=t_o$ of target acquisition.

The line of sight angle $\gamma_o$ can be determined, for example, by Doppler frequency selection.

Figure 2:
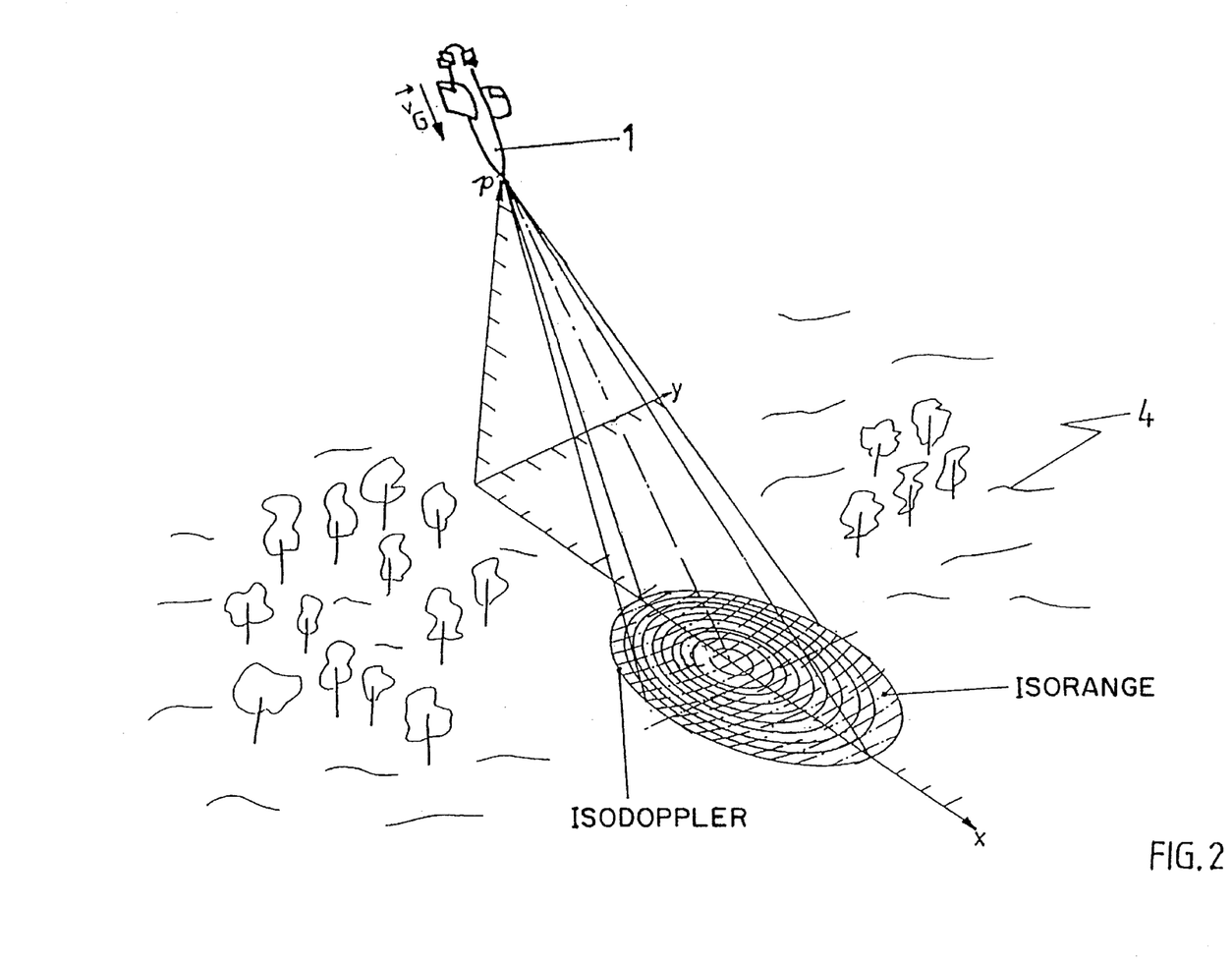
FIG. 2 depicts the flying body during its target seeking phase.

FIG. 2 shows flying body 1 during the target seeking phase.

All target points with viewing directions of the same angle relative to the inherent velocity vector v̄ of flying body 1 result in echo signals having the same Doppler shift relative to the transmitting frequency of the radar system. The curves of intersection of these viewing directions with the ground 4 can be described by locus curves (Nyquist plots) having a constant Doppler shift, also called "iso-Doppler" curves. They are approximately elliptical, with the distances between the ellipses, if the frequency difference remains constant, becoming smaller and smaller with increasing line of sight angle.

Locus curves of the same distance, also called "iso-ranges", are circles around the projection of flying body 1 on the ground 4 which, when viewed over a spherical angle that is not too large, have an approximately constant distance. The antenna lobe of the radar system of flying body 1 cuts out a certain portion from this family of curves.

The FLSAR method evaluates the echo signals of each distance range over a narrow band so as to realize an angular resolution from the Doppler effect instead of from the antenna lobe.

The resolution cells are thus determined by the intersections of the iso-ranges with the iso-Dopplers and not by the intersections of the iso-ranges with the antenna lobe.

Use of the FLSAR method with the present invention results in significant advantages compared to prior art millimeter wave radar concepts. These advantages become particularly evident from a comparison between the FLSAR method employed with the present invention and the conventional millimeter wave radar method which employs the antenna lobe for transverse resolution.

The angular resolution obtainable with a certain evaluation bandwidth B of the radar system increases with the deviation from the inherent velocity vector v̄. The most inaccurate "Doppler cell", which extends directly around the penetration point of the velocity vector into the ground 4 (Earth's surface), is no broader—even if a transmitting frequency, for example, in the $K_u$ band were employed—than the angular resolution of a radar target seeking head at the same distance with a lobe width that could be realized with the aperture available in a flying body only with transmitting frequencies in the millimeter wave range.

In contrast to such a radar which would have to perform a scanning movement in the stated range to search for a target, a FLSAR head requires a much longer integration time (reciprocal of the Doppler evaluation bandwidth) which, however, it has available because it is able to observe the entire target area simultaneously.

Even with a millimeter wave radar system, the resolution outside of the center of the searching range could be improved by Doppler beam sharpening (DBS) (at the higher frequency, the same resolution could be realized already with an integration time that is proportionally shorter) but the necessity continues to exist for sequential scanning of the search region, either mechanically or by means of a steered phase array antenna which, however, at present cannot yet be realized for use in the millimeter wave range.

For target detection and classification there is no significant difference, in a first approximation, between FLSAR and millimeter wave radar if angular and range resolution are approximately the same in each case since it is immaterial for the selection of criteria and classifiers in which way the resolution cells are formed. The additional evaluation of the echoes after co-polarization and cross-polarization is also possible with FLSAR by the appropriate construction of the antenna system. However, great differences result when the manner of guiding the flying body onto the target is considered.

In order to be able to track the target and determine the line of sight rotational velocity as a measure for the necessary guidance instructions, the conventional millimeter wave radar must be able to constantly look at ground target 4 and must be decoupled, for example, by means of a gimbal, from all movements of flying body 1. For this purpose it is additionally necessary to have a reference system which could be realized, for example, as a gyro platform. With respect to the guidance of a flying body, the proportional navigation method is usually employed for this purpose. The gimbal as well as the gyro platform are complicated and therefore expensive precision mechanical component groups which considerably increase the price, in particular, of the target seeker head and which must be considered to be very risky with respect to their realization as, for example, end-phase guided artillery ammunition because of the high demands for their ability to withstand launching.

In contrast thereto, as will become evident from the following considerations, a wide lobe antenna fixed to the flying body, which will be discussed in greater detail below, makes it possible to dispense with not only the gimbal but also the reference system.

When flying toward ground targets 3, the course provided by a proportional navigation guidance method would not be the best for the flying body 1 according to the invention because, compared with a speed of ground target 3 that is slower to negligible compared to the inherent velocity $V_G$ of the flying body, the proportional navigation method results in a course which leads to ground target 3 on a direct approach, that is, with a line of sight angle near zero. The line of sight angle during target acquisition provides a defined angular resolution which, together with the range resolution, furnishes a sufficient signal to clutter ratio S/C. If the angular resolution would decrease faster than the distance from the target, the ratio S/C would become correspondingly worse which could lead to loss of the target and termination of the target tracking.

In a preferred embodiment of the method according to the invention it is therefore provided that flying body 1 moves on a flight path on which the ratio S/C is constant, if possible, over the entire flight path. A constant S/C means that the line of sight angle during the guidance phase must not decrease at a greater degree than would be in proportion to the target range.

A very good approximation to this flight path is a circular path which at the moment of acquisition has the inherent velocity vector $\bar{v}$ as a tangent and passes through the target location. In this method, flying body 1 is thus not guided on a constant line of sight angle according to the principle of the proportional navigation method but on a constant path radius.

This is possible in that a line of sight angle for a constant S/C is given as the desired value as a function of the target range and the line of sight angle at the moment of acquisition, and this desired value is compared with the actual line of sight angle between the target bearing and the inherent velocity vector $\bar{v}$. According to the deviations resulting from this comparison, a controller actuates the guidance system.

With the applicable values for the aperture angle of the antenna diagram of the antenna fixed to the flying body between, for example, ± 10 degrees and ±20 degrees, that is, an initial target deviation in the same magnitude or less, flying the described circular path compared to the straight flight path line resulting with the conventional proportional navigation method means flight times that are longer only in the order of fractions of seconds, which is insignificant in view of the maximum possible speeds of ground targets.

Thus, if, for example, a. the attack (incidence) angles required to maneuver flying body 1 are less than half the half-width of the antenna lobe;

b. the approach path is so steep that the point of intersection of the inherent velocity vector with the ground 4 lies still within the range of the radar system;

c. flying body 1 is equipped with four receiving channels which can be combined according to a two-plane monopulse method into azimuth difference signal, elevation difference signal and sum signal; and d. the receiving channels have such stable characteristics that a reproducible characteristic for "error voltage over angular deviation" is available in both planes, then flying body 1 simultaneously has the following information available at every point in time:

1. the inherent velocity as the maximum measurable Doppler effect;

2. the distance of the ground as the distance of the point of maximum Doppler effect;

3. the relative speed to the target as the Doppler effect of the target;

4. the target range;

5. the direction of the line of sight to the target compared to the path vector from the monopulse characteristic; and 6. the component for the inherent velocity of the target in the line of sight direction as the difference between the relative speed in the target direction and the inherent velocity of the flying body multiplied by the cosine of the line of sight angle.

With these values, the line of sight angle between the target bearing and the inherent velocity can be measured directly independently of the attack angle of the projectile. A separate reference system for storing the path vector is thus no longer necessary if the above-mentioned conditions are met.

Figure 3:
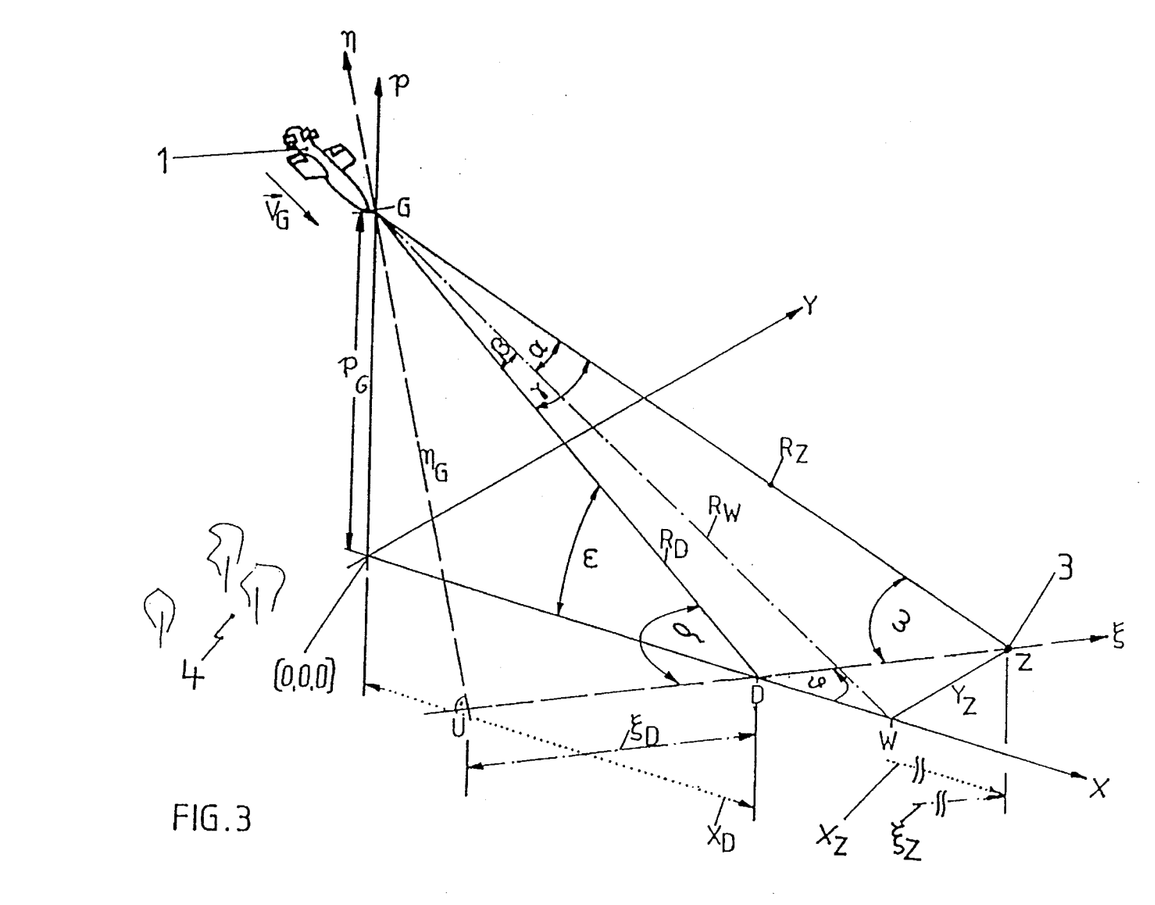
FIG. 3 depicts the system concept of the method according to the invention employing an integrated forward looking synthetic aperature radar (FLSAR) method.

FIG. 3 shows as an example a system concept for the method according to the invention which employs the integrated FLSAR method.

After folding out its wings and possibly the rudder, flying body 1 is guided onto a flight path which has a pierce angle of about 45°. A flattening (pull-out) maneuver for horizontal flight is thus not necessary.

This flight path can be controlled by the radar system provided in flying body 1.

The search for targets takes place, for example, beginning with a height of about 1500 m and with an antenna lobe width of, for example, about 25°.

With a transmitting frequency of, for example, 18 GHz (corresponds to a wavelength of 16.7 mm) this lobe width of 3 dB can be obtained with individual antennas having a diameter of about 40 mm as the product of transmitting and receiving diagrams.

As shown in FIG. 3, seen geometrically, the following situation arises,

In a ground referenced coordinate system x, y, p determined by the projection of the momentary location of the flying body 1 on ground 4 (the Earth's surface) and the penetration point D of the inherent velocity vector $\bar{v}$—whose magnitude results from the distance $R_D$ between flying body 1 and penetration point D—the flight path plane ($\xi$, $\eta$) is defined by its abscissa $\xi$ and its ordinate $\eta$. Approximately in this flight path plane, a circular path must be placed which is tangent on the path vector and touches the target point Z insofar as this path vector coincides with the inherent velocity vector $\bar{v}_g$.

As shown in FIG. 3, the following relationships will also result between the ranges $R_D$, $R_W$, $R_Z$ and the spherical angles $\alpha$, $\beta$, $\gamma$ and between the ground referenced distances $x_Z$, $x_D$ between the momentary projection of the flying body on the ground 4 and points Z, D. The flying body here is at a height $p_G$.

The designation $R_D$ is understood to mean the distance between flying body 1 and the penetration point D of the inherent velocity vector $\bar{v}_g$, $R_W$ is the distance between flying body 1 and a penetration point W, and $R_Z$ is the distance between flying body 1 and target point Z. Penetration point W is a point on the ground 4 resulting from an extension of the longitudinal axis of the flying body and coinciding with path vector 21 of FIG. 1. Spherical angle e lies between path ($\overline{GW}$) from flying body 1 to penetration point W and path ($\overline{GZ}$) from flying body 1 to penetration point Z. Spherical angle $\beta$ lies between paths ($\overline{GD}$) from flying body 1 to penetration point D and path ($\overline{GW}$) from flying body 1 to penetration point W. The designation G in the above path statements designates an up point in flying body 1.

Spherical angle $\gamma$ is the line of sight angle determinative for the Doppler shift.

From the formation of the internal products for path vectors $\bar{v}\,\bar{v}$, $\bar{v}\,\bar{v}$and $\bar{v}\,\bar{v}$, and the customary representation of the components, the following applies at the moment of target acquisition:

$$\vec{GD} = \{x_D; 0; -p_G\} \quad (3.0.1)$$

$$\vec{GZ} = \{x_Z; y_Z; -p_G\} \quad (3.0.2)$$

$$\vec{GW} = \{x_Z; 0; -p_G\} \quad (3.0.3)$$

$$\cos \gamma = \frac{x_D \cdot x_Z + p_G^2}{R_Z \cdot R_D} \quad (3.1)$$

$$\cos \alpha = \frac{x_Z^2 + p_G^2}{R_Z \cdot R_D} \quad (3.2)$$

$$\cos \beta = \frac{x_Z \cdot x_p \cdot p_G^2}{R_W \cdot R_D} \quad (3.3)$$

For plane angle $\theta$ and the above momentary components, the following relationships result:

$$\theta \bigg|_{x_Z > x_D} = \arctan y_Z x_Z - x_D \quad (3.4.1)$$

$$\theta \bigg|_{x_Z = x_D} = \frac{\pi}{2} \quad (3.4.2)$$

$$\theta \bigg|_{x_Z < x_D} = \arctan \frac{y_Z}{x_Z - x_D} + \pi \quad (3.4.3)$$

The following applies for spherical angle $\rho$:

$$\rho = \omega - \gamma \quad (3.5)$$

In this case, spherical angles $\rho$, $\omega$, and $\theta$, respectively, lie between paths $\overline{GD}$ and $\overline{DU}$, between paths $\overline{GZ}$ and $\overline{DZ}$, and between paths $\overline{DZ}$ and $\overline{DW}$, respectively.

These paths are here delimited by points G, D; D, U; G, Z; D, Z; D, Z; and D, W. Points G, U, D and Z are points in the flight path plane ($\xi$, $\eta$). U is the origin of the imaginary two-dimensional cartesian coordinate system of flight path plane ($\xi$, $\eta$).

Path $\overline{GU}$ has a length $\eta_G$, path $\overline{UD}$ has a length $\xi_D$ and path $\overline{UZ}$ has a length $\xi_Z$.

Moreover, spherical angles $\epsilon$ and $\theta$, respectively, lie between paths $\overline{(O,O,O)D}$ and $\overline{DG}$, and between paths $\overline{DW}$ and $\overline{DZ}$, respectively. The term (O,O,O) is understood to mean the origin of the ground-fixed cartesian coordinate system having the components x, y and p.

Figure 4:
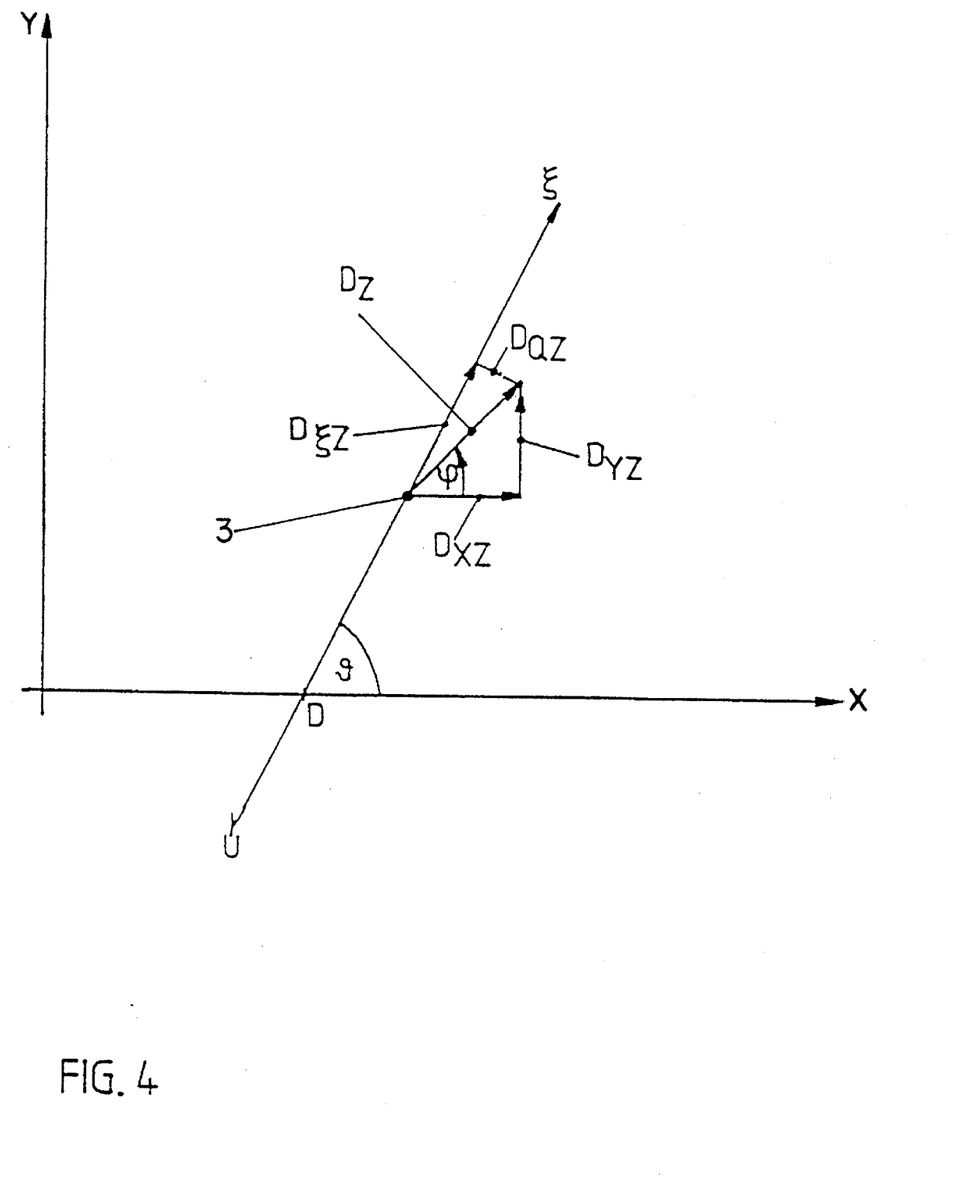
FIG. 4 depicts the division into components of the movement of a moving ground target.

FIG. 4 depicts the division into components of the movement of ground target 3 of FIG. 3, insofar as the latter is a moving target. In FIG. 4, reference elements x, y, $\xi$, U, D and $\theta$ have been taken over from FIG. 3 as they are necessary to illustrate the movement of the ground target.

If one assumes that ground target 3 is moving in spatial direction $D_Z$, the speed of the moving ground target 3 appears broken down into components in flying body 1.

One component $D\xi_Z$ lies in the flight path plane ($\xi$, $\eta$), makes a contribution to the relative velocity in the target direction and thus results in a difference between the product of inherent velocity of flying body 1 and cos $\gamma$ and the measured value for the relative velocity in the target direction.

The angle between the target bearing and ground 4 can be calculated from the target range $R_Z$ between flying body 1 and target 3 of FIG. 3, the distance $R_D$ to the penetration point D and the line of sight angle 7 and this also provides the component of the target speed in the flight path plane ($\xi$, $\eta$).

Another component $D_{OZ}$ lies perpendicular to the flight path plane and appears in flying body 1 as the rotational velocity of the flight path plane in flying body 1.

From the above-described measured values, the maneuvering acceleration required to obtain the correct circular path can be determined unequivocally in flying body 1 according to magnitude and bearing.

As can be seen in FIG. 4, the following relationships apply with respect to the individual components:

$$D_Z = \sqrt{D_{XZ}^2 + D_{YZ}^2} \quad (4.1)$$

$$D_{\xi Z} = D_Z \cos(\theta - \phi) \quad (4.2)$$

$$D_{QZ} = D_Z \sin(\theta - \phi) \quad (4.3)$$

where $$\phi = \arctan \frac{D_{YZ}}{D_{XZ}} \quad (4.4)$$

In this case, the general motion vector $D_Z$ of ground target 3 is divided into a component $D_{\xi Z}$ in the flight path plane and a component $D_{QZ}$ perpendicular thereto. Component $D_{\xi Z}$ produces a radial component in the direction toward flying body 1 and can thus be measured. Component $D_{QZ}$ produces a rotation of the flight path plane about the inherent velocity vector $\bar{v}$. The angle $\phi$ is understood to be a spherical angle resulting from the division into components of motion vector $D_Z$, namely a component $D_{YZ}$ parallel to the y axis and a component $D_{XZ}$ parallel to the x axis of the x, y coordinate system.

FIG. 5 also shows a section of the flight path plane ($\eta, \xi$) of FIG. 3. Here again reference elements from FIG. 3 have been taken over. These are the reference elements $\eta, \xi, 1, V_G$ 3, $R_D, R_Z$, G, U, D, Z, $\omega$ and $\rho$. Reference element $\Delta Z$ is described as in connection with FIG. 1. As can be seen in FIG. 5, flying body 1 flies approximately on a circular arc which follows tangentially the initial inherent velocity vector, here shown as a parallel shifted vector $\bar{v}$, and goes through target point Z.

As an example, let the case now be considered in which the speed $V_Z$ of ground target 3 at target point Z equals zero. Thus the following results:

$$\sin \gamma_0 = \frac{R_{Z_0}}{2 r_0} \cdot \frac{1}{r_0} \quad (5.1.0)$$

$$r_0 = \frac{R_{Z_0}}{2 \sin \gamma_0} \quad (5.1.1)$$

where $\gamma_0$ and $R_{Z_0}$ are the measured values r and $R_Z$ at time $t = t_o = 0$. The controlling transverse acceleration $b_q$ to be generated by flying body 1 follows the following relationship:

$$b_q = \frac{V_G^2}{r_0} \quad (5.2.0)$$

and, respectively, using Equation (5.1.1)

$$b_q = \frac{2 V_G^2}{R_{Z_0}} \cdot \sin \gamma_0 \quad (5.2.1)$$

and, if $b_q$ is constant, results in the circular arc to be flown.

The term $r_O$ is here understood to mean the radius r at time $t = t_O = 0$ for the flight path circle of flying body 1 around the center point $M_O$. Center point $M_O$ is here shifted on path $\overline{GM_O}$ and $\overline{GM}$, respectively, by a distance dr, with point M on the path being located between points G and $M_O$ of path $\overline{GM_O}$. M lies at the point of intersection between path $\overline{GM_O}$ and a line which orthogonally intersects distance $R_Z$ and is located approximately at the minimum distance from target Z.

The transverse resolution Q in the region (range) a detected ground target thus results as follows:

$$Q = \frac{R_Z}{\frac{2 f_s}{c} \cdot V_G \cdot \frac{1}{B} \sin \gamma} \quad (5.1)$$

where $R_Z$=the direct distance between flying body 1 and ground target 3 at target point Z, $f_S$=the frequency of the transmitted signal, c =the speed of light, $V_G$=the inherent velocity of flying body 1, B=the evaluation bandwidth of the radar system of flying body 1, and $\gamma$=the line of sight angle.

This results in the following for the target resolution at time $t = t_O = 0$ at which ground target 3 is detected by flying body 1:

$$\frac{R_Z}{\sin \gamma_0} = C_0 \cdot \frac{2 f_s}{c} \cdot V_G \cdot \frac{1}{B} \quad (5.2)$$

In the variables of Equation (5.2) the index 0 symbolizes that these are the variables at time $t = t_O = 0$ mentioned above; for example, represents the line of sight angle at time $t = 0$.

From Equation 5.2 it follows quite generally that:

$$X(t) \cdot \sin (t) = \frac{R_Z(t)}{r_0} \quad (5.3)$$

and from $$\frac{R_Z(t)}{\sin \gamma(t)} = r_0 = \text{constant} \quad (5.4)$$

it follows that $$C(t) = C_o \quad (5.5)$$

The variables appearing in Equations (5.3) to (5.5) are identical with the variables discussed earlier. In other words, the above result indicates that C, and thus S/C, remains constant over the entire flight path insofar as flying body 1 flies on a circular arc.

Figure 6:
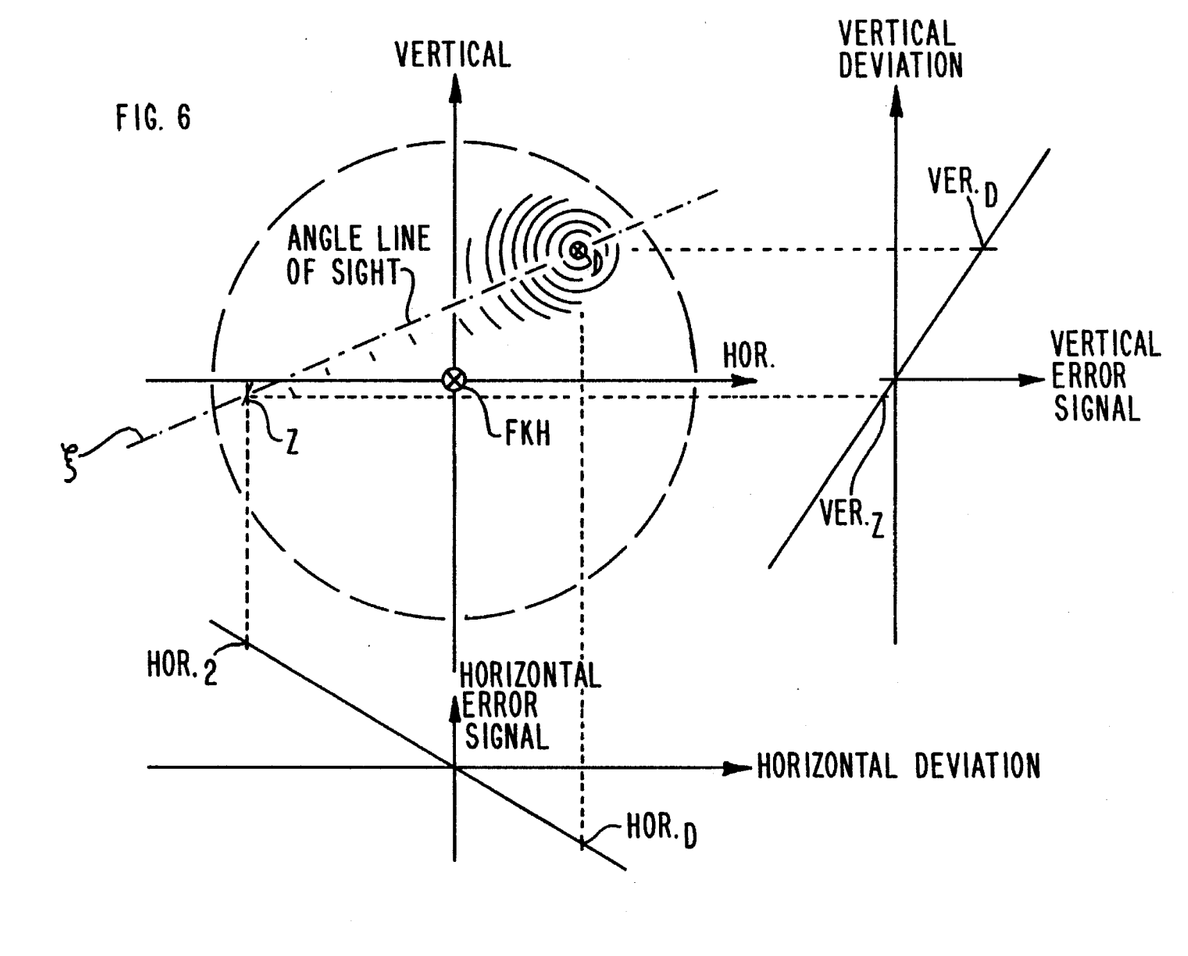
FIG. 6 depicts a possible target approach scenario as seen from the flying body.

FIG. 6 shows as an example a possible target approach scenario as seen from the flying body.

Within the scope of this scenario it is assumed that target acquisition has taken place, that a moving target is involved and that one component of the target speed lies in the plane of the flight path, the inherent velocity vector of the flying body is oriented in the direction of its penetration point, and a guidance maneuver has been initiated so that the major axis of the flying body at the moment is no longer oriented in the direction of the penetration point. Based on this scenario, the drawing figure shows a cartesian coordinate system for the flying body with a vertical axis Ver. and a horizontal axis Hor., as well as an axis FKH that is perpendicular thereto and preferably coincides with the major axis of the flying body. The inherent velocity vector $\bar{v}$ is oriented in the direction of its penetration point D around which locus curves of a constant Doppler shift are drawn. Penetration point D and the above-mentioned target Z here lie on the $\xi$ axis of the flight path plane ($\xi, \eta$) of FIGS. 1 and 3 to 5, with only axis $\xi$ being shown here. If target Z moves, one component of the target speed now lies in the plane of the flight path and thus contributes to the relative speed in the target direction, as this can also be seen, for example, in FIG. 4. If this scenario is now transferred for purposes of illustration to the generally known monopulse method (a name for a manner of illustration, for example, for the evaluation of received radar signals and not to be confused with the monopulse method known from the radar signal generating art), the described illustration is expanded in FIG. 6 by two coordinate systems in which a horizontal error signal and a vertical error signal are plotted as a function of the horizontal or vertical deviation, respectively, in this two-dimensional cartesian coordinate system. Target Z as well as penetration point D are reproduced in a known manner in both coordinate systems, as points $Hor._Z$, $Hor._D$ and $Ver._Z$, $Ver._D$, respectively, as has been done in FIG. 6 for the scenario applicable there. During the further course of the target approach flight, points $Hor._Z$, $Hor._D$, $Ver._Z$, and $Ver._D$, may change their position and, once the major axis FKH of the flying body is oriented directly toward target Z (toward the end of the target approach phase) they lie approximately in the respective origin of the mentioned coordinate systems.

Figure 7:
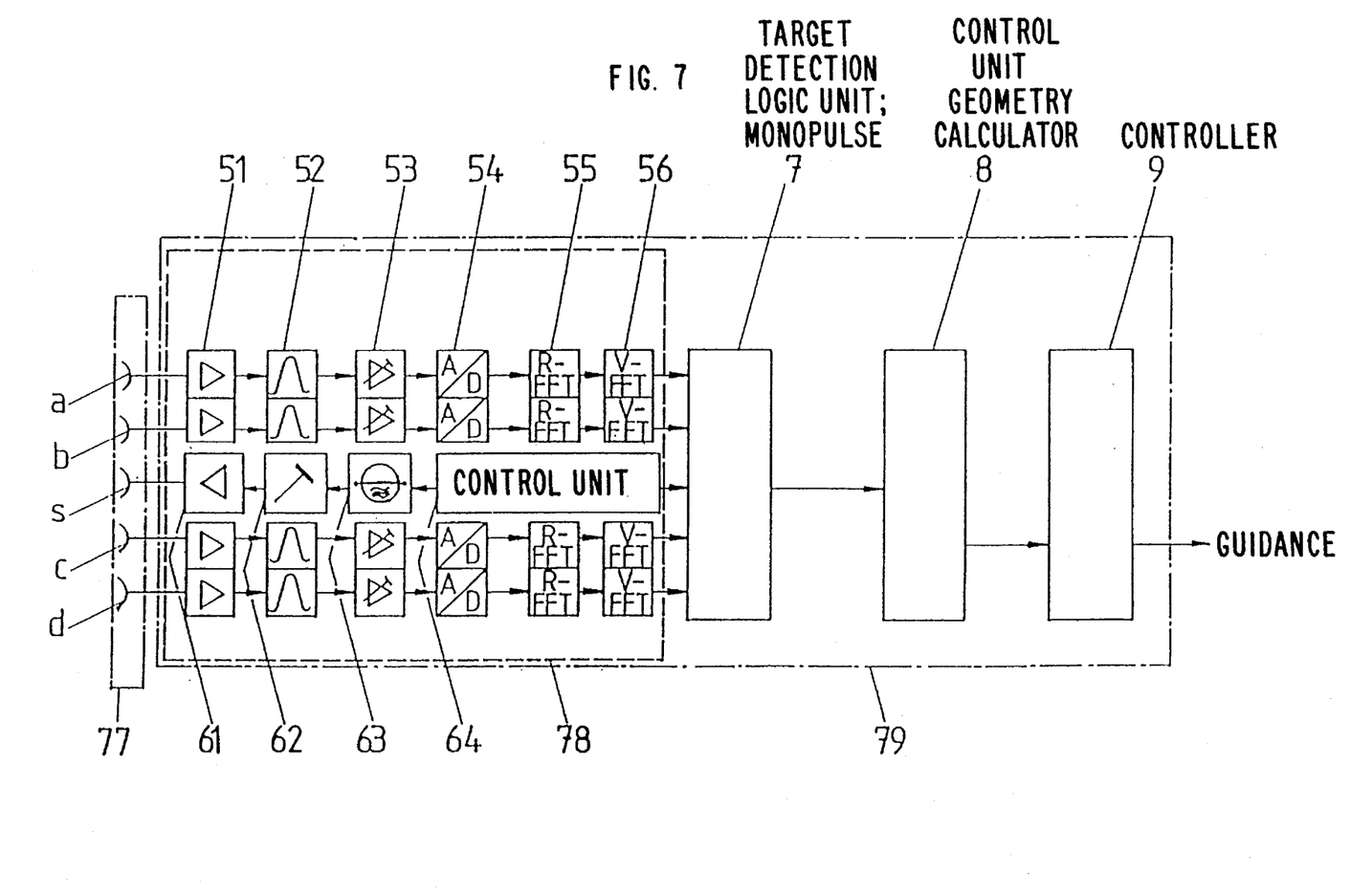
FIG. 7 is a block circuit diagram of a preferred embodiment of the arrangement according to the invention.

FIG. 7 shows a preferred embodiment of the arrangement according to the invention for implementation of the method according to the invention. The arrangement is composed of a radar target seeker head, also called a radar seeker. It includes an antenna array 77 composed of a transmitting antenna s and four receiving antennas a to d. Transmitting antenna s and receiving antennas a to d are approximately of the same size and are installed in flying body 1 as can be seen, for example, in FIG. 7. An alternative embodiment (not shown) provides that receiving antennas a to d are grouped around transmitting antenna s on the exterior of flying body 1. The selection of the transmitting frequency is basically not subject to any limitations; however, advantageously it lies in the low GHz range, for example, at about 18 GHz.

Antenna array 77 is switched to act onto a transmit/receive unit 79. This transmit/receive unit 79 is formed of further component groups 78, a target detection logic unit 7, a geometry calculator 8 and a controller 9. The individual antennas s and a to d are here connected by way of the further component group 78 to act on target detection logic unit 7. This target detection logic unit 7 (considered electrically) is followed by geometry calculator 8 and controller 9 for controlling flying body 1.

Transmitting antenna s is actuated by a control unit 64 via a modulator 63, a control stage 62 connected to the output of modulator 63, and a power stage 61 connected to the output of stage 62.

Control unit 64 also actuates target detection logic unit 7.

Each receiving antenna a to d is connected with target detection logic unit 7 by a respective signal channel including the series connection of component groups including an amplifier 51, a filter 52, a controllable amplifier 53, an A/D converter 54, a range filter bank 55, a velocity filter bank 56, preferably realized as a Fast Fourier Transform, possibly with focusing, for compensating nonlinearities of the echo frequencies in component groups including R-FFT 55 and V-FFT 56.

As can be seen in FIG. 7, the above-mentioned component groups are connected in series with one another. The arrangement according to the invention thus operates as follows.

The transmitting power is generated in two stages and is beamed out by transmitting antenna s. Modulator 63, controlled by the control unit 64 of the target seeker of flying body 1, generates a sawtooth-shaped frequency modulation.

This radar system operates according to the FM-CW method. As an alternative, a radar system operating according to the pulse method with or without additional modulation to increase the distance resolution may be employed. In the FM-CW method, the spectrum of the echo signals is significantly narrower than in a pulse method. Therefore it is possible to perform homodyne mixing and the echo signals can be digitized very early in the signal train. The four parallel analog branches are each composed only of a receiving mixer (possibly with an HF preamplifier preceding it), a filter provided with a damping characteristic that is adapted to the proportionality of the echo frequency and the range attenuation (SRC filter, also called a sensitive range control filter) and, for example, an AGC amplifier (also called automatic gain control amplifier).

The simplicity and narrowbandedness of the radar system facilitates meeting the requirement for stability and synchronism of the signal branches and permits the postponement of the formation of sum and difference diagrams until the geometry calculator 8 instead of in a comparator disposed in the HF plane. If the correct coefficients are selected, it would also be possible to generate asymmetrical diagrams with zero locations in a desired direction (adaptive-null-zero steering). In this way, the interference resistance of the radar seeker is significantly increased.

In target detection logic unit 7, the sum signals are formed for each resolution cell and algorithms for detecting and classifying the target are applied for the groups of cells that are adapted to the respective type of target. The algorithms for a possibly incorporated adaptive null steering process may also be integrated in this component group.

After target acquisition, the signals available in the radar seeker (for example, the inherent velocity, the distance from the ground, the radial velocity in the target direction, the range of the target, azimuth and elevation deviations of target and penetration points) are fed to geometry calculator 8. During target tracking, target detection logic unit 7 runs in parallel so that the correct resolution cells are always evaluated as the target.

Geometry calculator 8 corresponds to the autopilot of the otherwise customary target seeking heads of flying bodies. The geometry calculator 8 converts the measurement data according to the guidance method to be realized into control signals for guidance controller 9.

An example of the course of a particularly favorable mission of a flying body will now be described:

launch and ballistic flight into the target area;

reconfiguration of the flying body into a guided flying body;

pivoting into a flight path that is suitable for searching;

seeking the target, detecting the target and acquisition of the target;

homing into the target.

Launch and ballistic flight relate to the target search head in the flying body insofar as it must be able to withstand the extreme mechanical and thermal stresses that are connected with the launch. The appropriate structural measures must be taken to accomplish this. However, this is facilitated, as already mentioned, by the elimination of the otherwise customary precision mechanical component groups of the gimbal and the gyro reference.

The reconfiguration into a guided flying body includes the release of the radome which must be appropriately protected against mechanical and thermal damage during storage, launching and ballistic flight, and the extension of the lifting flaps and steering devices (rudders). The requirements with respect to maneuverability for a flying body according to the present invention are lower than for a flying body equipped with a millimeter wave target seeker in the flying body since the requirement for a horizontal search flight is no longer applicable;

the acquisition ranges are greater and therefore more time is available for maneuvers to reach targets at the edges of the field of view.

Pivoting into a flight path suitable for searching means that the course of the ballistic curve is changed to a linear course which has a pierce angle of about 45° relative to the Earth's surface. As soon as the height is sufficiently low (depending on the reflectivity of the ground, for example, between 2,000 and 3,000 m), the target seeker of the flying body is able to cover the ground and determine the path angle in relation to the axes of the flying body. From the range distribution along a certain line of sight angle (Doppler effect), the pierce angle can be determined and corrected.

The locus curve of a certain Doppler effect on the ground is an ellipsis along which the range changes to a greater or lesser extent depending on the pierce angle. In the range-velocity diagram (R-V diagram), this ellipsis is formed as a row of range cells shifted downward by a factor of cos γ from the maximum velocity.

Because of the long integration time required for a Doppler analysis, target search, target detection and target acquisition require compensation of inherent movement because during an integration period of, for example, 64 ms, the projectile typically moves by 12 to 19 m, that is, a multiple of the depth of a range cell. This compensation of inherent movement takes place, expressed in a simplified manner, by modulation of the received signals with the "chirp" signal which counteracts the modulation caused by the inherent movement.

The methods for target identification and wrong target rejection employed in the past already with a millimeter wave target seeker in the flying body, may be employed here in a similar manner since the dimensions of the resolution cells are comparable.

Figure 8:
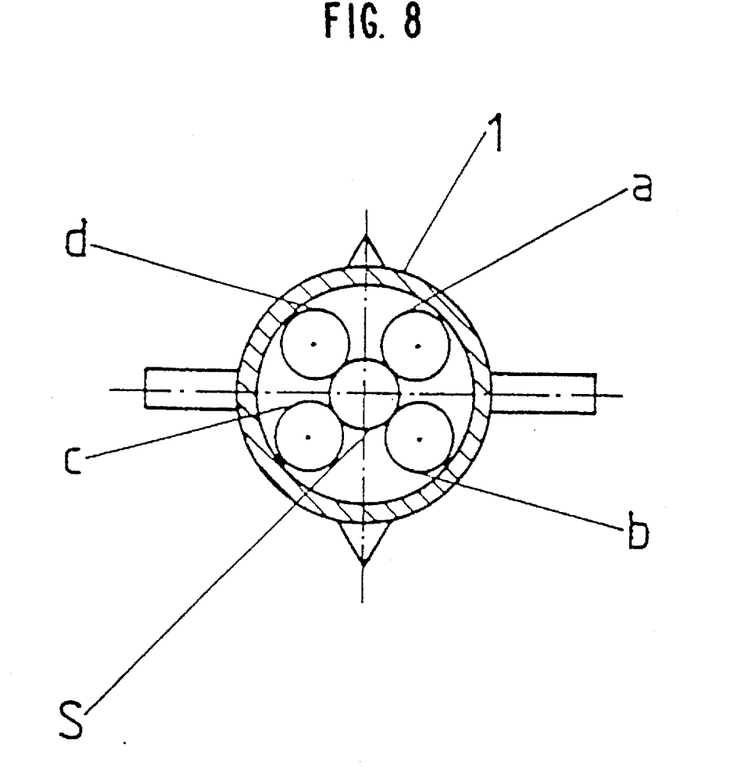
FIG. 8 depicts a preferred antenna configuration for the arrangement according to the invention as shown in FIG. 7.

FIG. 8 shows as an example a possible configuration of the antenna array 77 composed of four receiving antennas a to d and a transmitting antenna s, the array as a whole having a diameter of, for example, about 120 mm. The Fraunhofer region diagrams of the individual antennas are not offset relative to one another, the angle error signals are obtained on the basis of the phase differences of the signals (phase monopulses).

Because of the low transmitting frequency $f_S$ and since the diagrams cannot be pivoted relative to the axes of the flying body, the configuration of the radome can be adapted much better to aerodynamic requirements than in the conventional millimeter wave radar target seeker.

On the basis of the arrangement of the individual receiving antennas a to d in flying body 1, azimuth and elevation, respectively, result as follows from addition of the received signals:

$$\text{azimuth} = \frac{a+c-b-d}{a+c+b+d} \quad (7.1)$$

$$\text{elevation} = \frac{a+b-c-d}{a+b+c+d} \quad (7.2)$$

For moving targets it is necessary to make a flight time and thus flight path correction. For this purpose, the flight time must be estimated, as indicated in FIG. 1, with reference to the moving target.

The flight time toward a moving target can be estimated, for example, as follows.

The estimated relative velocity between the flying body 1 and the moving target 3 is the following:

$$V^*_r = V_G \cdot \cos\gamma^* + V_Z \cdot \cos\omega^* \quad (8.1)$$

where $V_s$ is the speed of flying body 1 measured in the direction of penetration point D, $\gamma$ is the measured line of sight angle and $\omega$ is the space angle of FIG. 3; $V_Z$ is the velocity of the ground target 3 of FIGS. 1 and 5 as it moves on the ground.

The * symbols identify the estimated values of the respective variable; these are not estimated for a stationary ground target.

In view of FIG. 5, the following results from (8.1):

$$V_Z = \frac{V_r^* - V_G \cdot \cos\gamma^*}{\cos\omega^*} \quad (8.2)$$

From the measured or estimated values $R^*_Z$, $R_D$, $\gamma^*$, it is possible to calculate a flight path toward $Z^*$. This flight path is characterized by $\gamma^*$, $\rho^*$, $\omega^*$, $\dot\rho^*$ ($\dot\rho$=time derivation of $\rho$ toward $T^*$) and the internal relationship between $\gamma$ and $\rho$ according to Equation (3.5) which, in the case of a moving ground target, can be converted to an equation of the form $\rho^*=\omega^*+\gamma^*$. With respect to this flight path, the target speed can be divided into a tangential component $V_{tZ}$ placed against the flight path and a radial component $V_Z$.

$$V_{tZ}=V_Z \cdot \cos(\omega^*-\gamma^*) \quad (8.3)$$

The following angular velocity $\dot\rho^*$ (around $M^*$) belongs to this tangential component:

$$\dot\phi^* = \left(\frac{\partial\phi}{\partial t}\right)^* = \frac{V_{tZ}}{r^*} \quad (8.4)$$

The estimated time results from:

$$T^* \cdot (\dot\rho + \dot\phi^*) = 2\gamma \quad (8.5)$$

to yield $$T^* = \frac{2\gamma}{\dot\rho + \dot\phi^*} = \frac{\Delta Z}{V_Z} \quad (8.6)$$

The estimated position at the moment of the hit is then shifted according to Equation (8.6) by $\Delta Z = T^* \cdot V_Z$. For the position of the target $\theta^*$ is calculated again in a further step and is utilized as desired value. This desired value is corrected by $\Delta Z$ so that the line of sight is not directed toward the hit point but toward ground target 3. The line of sight deviation $\Delta\gamma$ resulting therefrom because of the movement of ground target 3 according to FIG. 5 over path section $\Delta Z$ is calculated from $$\Delta Z = R^2_D + R^2_Z - 2R_D \cdot \cos\Delta\gamma \quad (8.7)$$

to yield $$\Delta\gamma = \arccos\left|\frac{R_D^2 + R_Z^2 - \Delta Z^2}{2R_D R_Z}\right| \quad (8.8)$$

This line of sight deviation $\Delta\gamma$ may here be utilized in an alternative manner to correct the flight path for a moving ground target 3 instead of performing a flight path correction on the basis of the path percentage change $\Delta Z$.

The correction of the flight time and the flight path, respectively, may be effected continuously during the duration of the entire target approach phase.

It is understood that the present invention is not limited to the described embodiments but can also be transferred to others. For example, it is possible to employ, instead of the described microwave signals, optical signals in the UV to IR range, for example laser signals, as the signals transmitted from the flying body. Correspondingly, the spectral sensitivity of the receiving antenna must then of course also be adapted to the transmitting spectrum of transmitting antenna s. This may then result, for example, in phototransistors being employed as receiving antennas.

It should be noted that the ground target may also be a target floating on water (e.g., a ship) and in that case the water is to be understood as the ground in the sense of the invention.

The invention now being fully described, it will be apparant to one of ordinary skill in the art that any changes and modifications can be made thereto without departing from the spirit or scope of the invention as set forth herein.

What is claimed is:

1. In a method for independently controlling a guidable flying body provided with a warhead, wherein the flying body is a projectile or a sub-caliber missile which is provided with an active target seeking head that transmits target seeking signals and receives reflected signals, and a guidance system, and which flying body is employed for combatting stationary and moving ground targets, which method includes emitting target seeking signals from the target seeking head, receiving reflected target seeking signals, evaluating the received reflected signals, and guiding the flying body along a flight path in response to the evaluated signals; the improvement wherein said step of guiding includes causing the flying body, during its target approach phase, to fly on a curved flight path such that, on the curved flight path, on the average, the ratio S/C between signals S reflected by a ground target and the signals C reflected from the ground is kept constant, or at least approximately constant, and with a path vector of the flying body during the target approach phase being oriented in a direction toward the ground.

2. A method as defined in claim 1, wherein said step of evaluating includes determining the range $R_Z$ of a target at a point Z, the range $R_D$ of a penetration point D of an inherent velocity vector $\bar{v}$ of the flying body into the ground, and a line of sight angle $\gamma$ between the two ranges $R_Z$ and $R_D$ with the aid of a forward looking synthetic aperture radar method.

3. A method as defined in claim 2, wherein the line of sight angle. $\gamma$ is measured directly by a monopulse method.

4. A method as defined in claim 1, wherein the flight path of the flying body is approximately a circular path if the ground target is stationary.

5. A method as defined in claim 4, wherein the ratio S/C is described approximately by the following relationship:

$$\frac{S}{C} = \text{constant} \simeq \frac{S}{\frac{R_Z}{\sin \gamma} \cdot \frac{c}{2f_s} \cdot B \cdot \frac{1}{V_G}}$$

where

S=the signal reflected by the ground target;

$R_Z$=the distance between the flying body and the ground target;

$\gamma$=the line of sight angle between the distance $R_Z$ from the flying body to the ground target and the distance $R_D$ between the flying body and the penetration point D of the inherent velocity vector $\bar{v}$ of the flying body;

c=the speed of light;

$f_s$=the transmitting frequency of the radar system of the flying body;

B=the evaluation bandwidth of the radar system of the flying body; and $V_G$=the inherent velocity of the flying body.

6. A method as defined in claim 1, wherein said step of guiding further comprises including a flight path correction in the curved path if the target is determined to be a moving ground target.

7. A method as defined in claim 6, wherein said step of including a flight path correction includes guiding the flying body toward an estimated point of impact that is removed from the momentary location of the target by a path section $\Delta Z$, with this path section $\Delta Z$ being estimated according to the following formula:

$$\Delta Z = V_Z \cdot T^*$$

where $T^*$=the estimated time of the hit;

$V_Z$=the speed of the ground target moving on the ground; and $\Delta Z$=the path section traveled by the ground target in an $\xi$, $\eta$ plane.

8. A method as defined in claim 6, including determining the speed of the ground target from a ratio of the radial velocity of the ground target to the inherent velocity $\bar{v}$ of the flying body multiplied by the cosine of a line of sight angle $\gamma$, and utilizing the determined speed of the ground target for the flight path correction.

9. A method as defined in claim 6, including one of calculating the flight path correction on-line and reading the flight path correction value to be used from a stored table.

10. A method as defined in claim 1, wherein said step of guiding includes causing the flying body to generate a transverse acceleration $b_q$ described by the following relationship:

$$b_q = \frac{2V_G^2 \sin \gamma_0}{R_{Z_0}}$$

where $V_G$=the inherent velocity of the flying body (1);

$\gamma_0$=the line of sight angle at the time of target acquisition; and $R_{Z_0}$=the target range at the time of target acquisition.

11. A method according to claim 2, wherein said step of guiding includes effecting a flight path correction for a moving ground target on the basis of the change in the line of sight angle $\Delta \gamma$.

12. In an arrangement for independently controlling a flying body which is provided with a warhead and which is a projectile or a sub-caliber missile, with said arrangement including an active target seeking head means for transmitting target seeking signals and for receiving echo signals, means for evaluating the received signals, and means responsive to an output signal from said means for evaluating for guiding said flying body; the improvement wherein: said means for transmitting and receiving includes one of an antenna array constructed of a plurality of transmitting and receiving antennas which is configured as a rigid component group that is fixed to the flying body and which is switched to act on a transmit/receive circuit unit which provides a signal to said evaluation means, and an optical array composed of at least one illumination source and a plurality of optical detectors configured as a rigid component group that is connected to the flying body, with the illumination source and the detectors being switched to act on a transmit/receive unit which provide an output signal to said evaluation means; and said means for guiding includes means for causing the flying body, during its target approach phase, to fly on a curved flight path such that, on the average, the ratio S/C between signals S reflected by a ground target and signals C reflected from the ground is kept substantially constant and a path vector of the flying body during the target approach phase is oriented in a direction toward the ground.

13. In an arrangement for, independently controlling a flying body which is provided with a warhead and which is a projectile or sub-caliber missile, with said arrangement including an active target seeking head means for transmitting target seeking signals and for receiving echo signals, means for evaluating the received signals, and means responsive to an output signal from said means for evaluating for guiding said flying body; the improvement wherein said means for transmitting and receiving includes an antenna array composed of a transmitting antenna and at least three receiving antennas which are of approximately equal size, with said antenna array being configured as a rigid component group that is fixed to the flying body and which is switched to act on a transmit/receive circuit unit which provides a signal to said evaluation means.

14. An arrangement as defined in claim 13, wherein said receiving antennas are grouped around the transmitting antenna within the flying body.

15. An arrangement as defined in claim 13, wherein the antenna array is provided with broad antenna lobes.

16. An arrangement as defined in claim 13, wherein the evaluation means connected to the transmitting and receiving unit includes a target detection logic unit followed by a geometry calculator and a controller for controlling the flying body.

17. An arrangement as defined in claim 16, wherein the transmit/receive unit includes a control unit and a circuit means responsive to an output from the control unit for activating the transmitting antenna and including a modulator, a control stage connected to an output of the modulator and a power stage connected to an output of the power stage and having an output connected to the transmitting antenna.

18. An arrangement as defined in claim 17, wherein said control unit, which additionally generates monopulse signals, has an output connected to and actuating the target detection logic unit.

19. An arrangement as defined in claim 16, wherein said receiving antennas are each connected with said target detection logic unit by a respective series connection of an amplifier, a filter, a controllable amplifier, an A/D converter, a range-fast fourier transform (R-FFT) filter and a velocity-fast fourier transform (V-FFT) filter.

20. An arrangement as defined in claim 12, wherein said at least one illumination source is a laser.

* * * * *